United States Patent
Bauldock, Sr.

(10) Patent No.: US 7,025,593 B2
(45) Date of Patent: Apr. 11, 2006

(54) TEACHING CIRCUMFERENCE INSTRUMENT

(75) Inventor: Gerald Bauldock, Sr., 16 Meadowbrook Pl., Willingboro, NJ (US) 08046

(73) Assignee: Gerald Bauldock, Sr., Willingboro, NJ (US)

(*) Notice: Subject to any disclaimer, the term of this patent is extended or adjusted under 35 U.S.C. 154(b) by 0 days.

(21) Appl. No.: 10/707,088

(22) Filed: Nov. 20, 2003

(65) Prior Publication Data
US 2005/0112533 A1    May 26, 2005

(51) Int. Cl.
*G09B 23/02* (2006.01)

(52) U.S. Cl. ..................................... 434/214

(58) Field of Classification Search ........... 434/188, 434/196, 208, 211, 213, 214, 215, 216
See application file for complete search history.

(56) References Cited

U.S. PATENT DOCUMENTS

| | | | | |
|---|---|---|---|---|
| 3,302,308 A | * | 2/1967 | Colacurcio | 434/215 |
| 3,339,297 A | * | 9/1967 | Stinn et al. | 434/190 |
| 3,414,190 A | * | 12/1968 | Lemiesz | 235/61 GM |
| 3,733,718 A | * | 5/1973 | Hill et al. | 434/216 |
| 5,215,467 A | * | 6/1993 | Brischke | 434/214 |
| 5,470,234 A | * | 11/1995 | Sher | 434/196 |
| 6,024,574 A | * | 2/2000 | Errthum | 434/216 |
| 6,293,800 B1 | * | 9/2001 | Robertson | 434/196 |
| 6,575,755 B1 | * | 6/2003 | Dreyfous | 434/196 |
| 6,702,582 B1 | * | 3/2004 | Salvo | 434/214 |

* cited by examiner

*Primary Examiner*—Kurt Fernstrom

(57) ABSTRACT

A device that teaches the relationship between a circle, its diameter and its radius. The device includes a circular ring that has a rigid intersecting bar representing its diameter. Attachment mechanism allows flexible diameter bars to be attached around the outer perimeter of the circle. Flexible bars the same size as the diameter or the radius are available to attach to the outer perimeter by way of the attachment mechanism. Additional flexible bars are available at 0.14 diameters and 0.28 radiuses in length. When the flexible diameter bars are attached to the circle, three diameters bars and one 0.14 diameter bar are affixed around the circle's circumference representing 3.14 diameters. When the flexible radius bars are attached to the circle, six radius bars and one 0.28 radius bar are affixed around the circle's circumference representing 6.28 radius.

16 Claims, 4 Drawing Sheets

TEACHING CIRCUMFERENCE INSTRUMENT

BACKGROUND OF INVENTION

1) Field of the Invention

The invention relates to devices, which provides a teaching method for geometric concepts relating to the circumference of a circle and for determining the value of the constant π(3.14). Across the nation, schools are going through a major reform in their math and science curriculum to bring education standards up to par. The facts show that there is an achievement gap between blacks and whites in mathematics and science. In 1999, when the latest National Assessment of Education Progress (NAEP) test was administered, large differences remained between average scores for blacks and Hispanics on the one hand, versus whites and Asians on the other. Nationally, the achievement gap did not narrow at all during the 1990s. In reading and math, gaps separating poor and minority students from others actually widened at most grade levels and remained the same or dropped only slightly at others (The Education Trust). By the end of grade 4, African American, Latino and poor students of all races are already about two years behind other students. By the time they reach grade 8, they are about three years behind. By the time they reach grade 12, if they do so at all, minority students are about four years behind other young people. The mathematics and science skills of 17-year-old African American and Latino students are similar to those of 13-year-old white students. African Americans and Latinos obtain college degrees at only half the rate of white students. The partnerships between government agency, industry, academia and private organizations are trying to address these issues along with many others. This invention provides a method for teaching the geometric concepts of a circle.

2) Prior Art

The prior art consists of teaching the theory and equations for the geometry of a circle. Lessons primarily consist of a mathematical explanation for the circumference of a circle showing that $C=\pi D$ or $C=2\pi r$. Demonstrations might include using a string or wire and placing it around the circumference of a circle. And then measure the length of the diameter and multiply it by 3.14 showing that it is about the same length as the string or wire. The present invention, as distinguished from the prior art, provides a device that clearly demonstrates that 3.14 diameter of a circle will fit around the circumference of that circle and that 6.28 radius of a circle will fit around the circumference of that circle. None of the prior art uses a device or tool that provides a circular ring, along with diameter bars or radius bars that will fit around the circumference showing the relationship of π and the diameter, or π and the radius to the circumference of the circle.

SUMMARY OF INVENTION

The present invention is designed to teach the relationship between a circle, its diameter and its radius.

One of the objectives of the present inventions is to provide a device that will bring the level of learning and understanding of the circumference of a circle to a conceptual level rather than just a fact remembering level as described in the Blooms Taxonomy.

Another objective is to clearly show that it takes 3.14 diameters to fit around the circumference of a circle by directly placing 3.14 diameter around the circumference.

Another objective is to clearly show that it takes 6.28 radius to fit around the circumference of a circle by directly placing 6.28 radius around the circumference.

Another objective is to clearly show that it takes 3.14 radius to fit half way around the circumference of a circle by directly placing 3.14 radius around half of the circumference.

Another objective is to show why π is approximately equal to 3.14.

Another objective is to clearly show that when unit diameters are placed around the circumference, the resulting angles between each diameter will be at approximately 0, 114.6, 229.2 and 343.8 degrees.

Another objective is to clearly show that when unit radius are placed around the circumference, the resulting angles between each radius will be at approximately 0, 57.3, 114.6, 171.9, 229.2, 286.5, and 343.8 degrees.

DETAILED DESCRIPTION

The present invention relates to a device designed to teach the relationship between a circle, its diameter and its radius.

Figure 1:
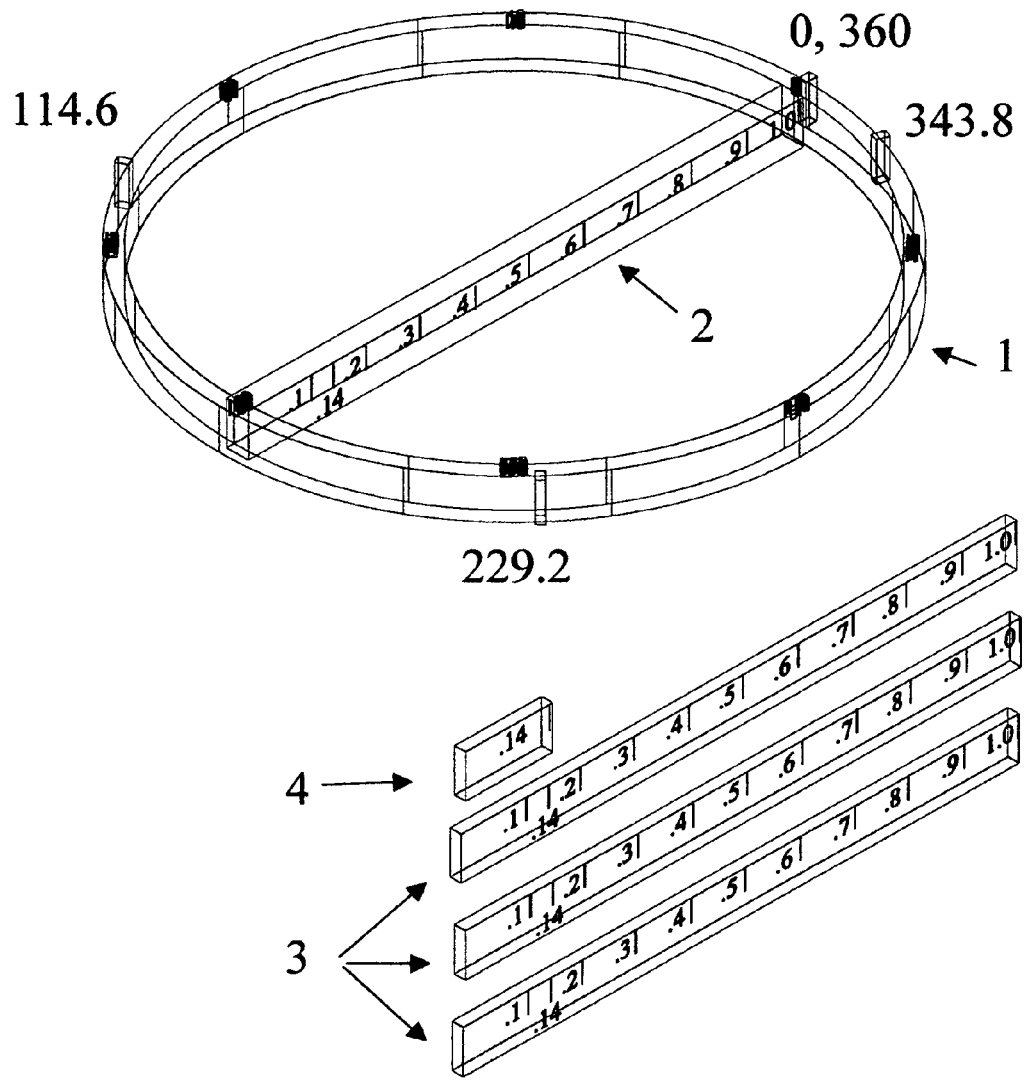
FIG. 1 is a plan view of the invention, including a circular ring designated by reference number 1, a rigid intersection bar representing its diameter designated by reference number 2, three full-length diameter bar designated by reference number 3, and a 0.14 length diameter bar designated by reference number 4.
Figure 2:
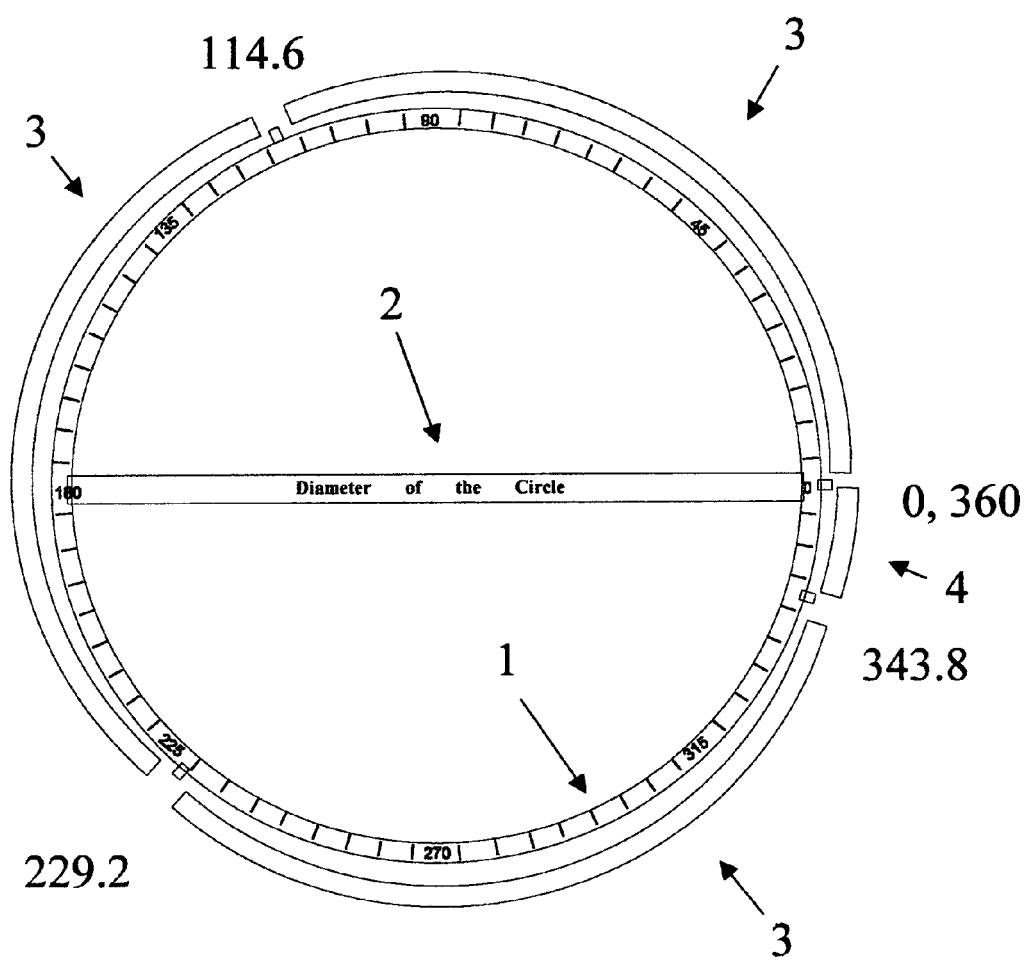
FIG. 2 is a top view of the invention showing where the three full-length diameter bars designated by reference number 3, and the 0.14 length diameter bar designated by reference number 4 are attached around the circumference of the circle. The diameter bars are spaced between angles of 0, 114.6, 229.2, 343.8 and 360 degrees.

Referring to FIG. 1, the device includes a circular ring designated by reference number 1, that has a rigid intersecting bar representing its diameter designated by reference number 2. The intersecting bar has marked off units dividing the bar into segments. The ring also has marked off units around the 360 degrees of the circle. Flexible bars, the same size as the diameter, designated by reference number 3 are available to attach around the outer perimeter by way of an attachment mechanism. An additional flexible bar is available at 0.14 diameters in length designated by reference number 4. When the flexible diameter bars are attached to the circular ring, three diameter bars and one 0.14 diameter bar are affixed to the ring representing 3.14 diameters.

Figure 3:
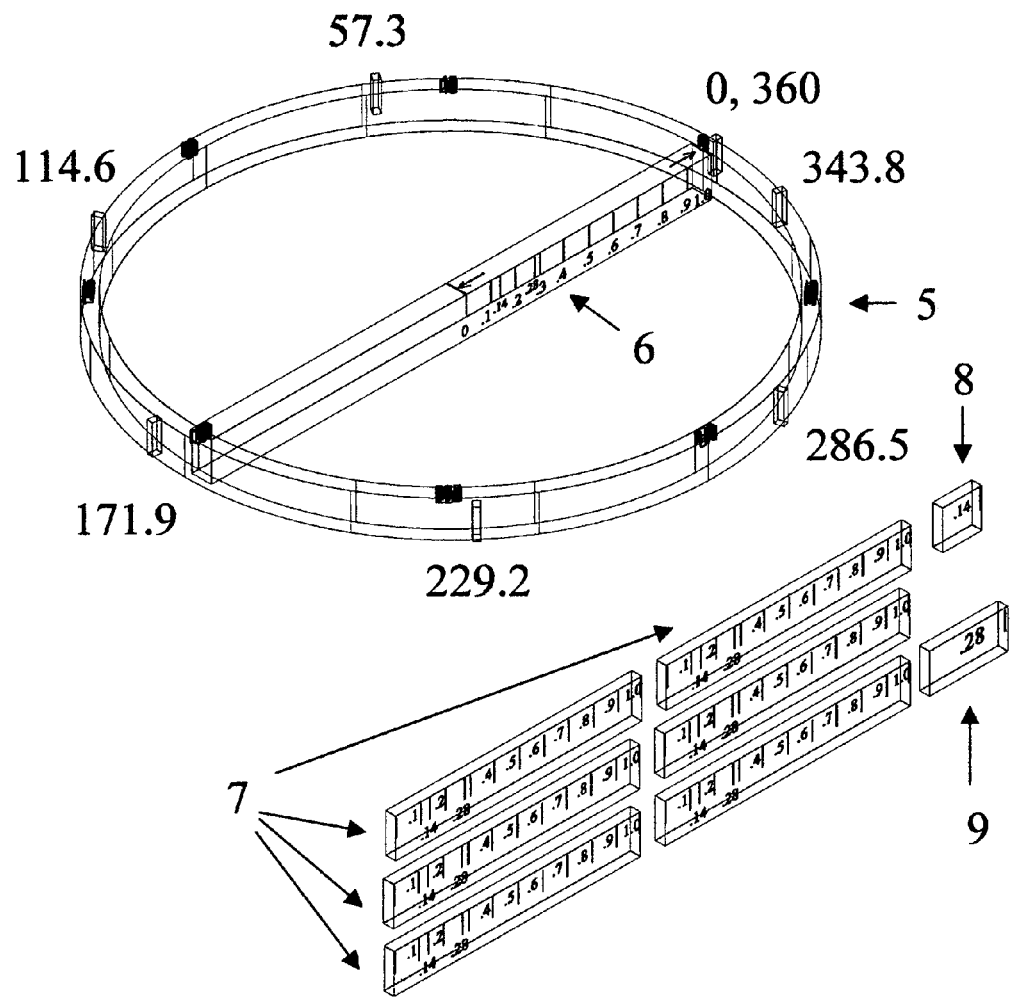
FIG. 3 is a plan view of the invention including a circular ring designated by reference number 5, a rigid intersection bar representing its radius designated by reference number 6, with six full-length radius bar designated by reference number 7, a 0.28 length radius bar designated by reference number 9, and a 0.14 length radius bar designated by reference number 8.
Figure 4:
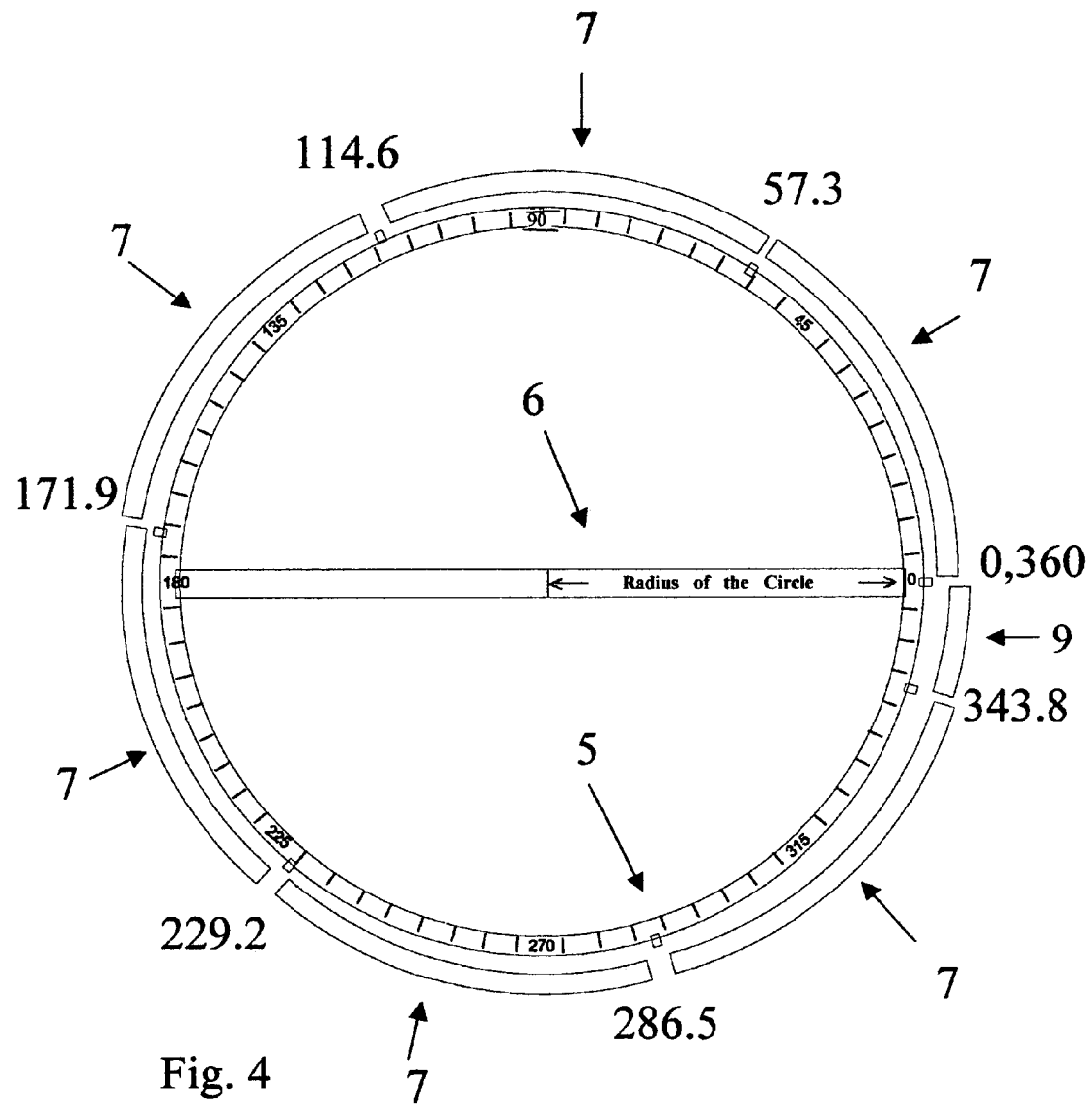
FIG. 4 is a top view of the invention showing where the six full-length radius bars designated by reference number 7, and the 0.28 length radius bar designated by reference number 9 are attached around the circumference of the circle. The radius bars are spaced between angles of 0, 57.3, 114.6, 171.9, 229.2, 286.5, 343.8 and 360 degrees.

Referring to FIG. 3, the circular ring designated by reference number 5, now has a rigid intersecting bar representing its diameter and showing the radius of the circle designated by reference number 6. The intersecting bar has marked off units dividing the radius into segments. Flexible bars the same size as the radius designated by reference number 7, are available to attach to the outer perimeter by way of an attachment mechanism. An additional flexible bar is available at 0.28 radiuses in length designated by reference number 9. When the flexible radius bars are attached to the circular ring, six radius bars and one 0.28 radius bar are affixed to the ring representing 6.28 radius.

Another additional flexible bar is available at 0.14 radiuses in length designated by reference number 8. When the flexible radius bars are attached to half of the circular ring, three radius bars and one 0.14 radius bar are affixed to the ring representing 3.14 radius.

Classroom activities can be developed using the present invention that will increase the level of understanding of the circumference of a circle and the value of $\pi$ (3.14). By attaching three diameter bars and one 0.14 diameter bar around the circumference of the ring, students can immediately see and understand the equation, circumference=3.14 diameters ($C=\pi D$). And it becomes clear why $\pi=3.14$.

By attaching six radius bars and one 0.28 radius bar around the circumference of the ring, students can immediately see and understand the equation, circumference=6.28 radius. Or written another way, circumference=2×3.14 radius ($C=2\pi r$).

By attaching three radius bars and one 0.14 radius bar around half of the ring, students can immediately see and understand that half of the circumference=3.14 radius (½× $C=\pi r$).

Participating in these activities brings the level of learning and understanding of the circumference of a circle to a conceptual level rather than just a fact remembering level as described in the Blooms Taxonomy.

I claim:

1. A device comprising a circular ring with a rigid intersecting bar representing its diameter, with three separate flexible bars that each has a length equal to the diameter of the circular ring and one flexible bar that is 0.14 times the diameter of the circular ring in length, wherein each of the flexible bars can be attached around the outer circumference of the circle by attachment mechanisms.

2. The device of claim 1, wherein the intersecting bar has marked off units dividing the bar into segments.

3. The device of claim 1, wherein the circular ring has marked off units around the 360 degrees of the circle.

4. The device of claim 1, wherein the attachment mechanisms allow the four flexible bars to be attached around the outer perimeter of the circle, and allow the flexible bars to fit around the perimeter of the circle occupying four arc lengths equal to the distance between 0 and 114.6 degrees, 114.6 and 229.2 degrees, 229.2 and 343.8 degrees, and 343.8 and 360 degrees of the circle.

5. The device of claim 1, wherein the first three flexible bars are the same size as the diameter and can be attached by bending or flexing around the outer perimeter by way of the attachment mechanism.

6. The device of claim 1, wherein the fourth flexible bar is 0.14 diameters in length and can be attached by bending or flexing around the outer perimeter of the circle by way of the attachment mechanism.

7. The device of claim 1, wherein when the three flexible diameters bars and one 0.14 diameter bar are affixed to the circular ring they represent 3.14 diameters.

8. The device of claim 1, wherein each attachment mechanism is a means for attaching the diameter bars to the circular ring.

9. A device comprising a circular ring with a rigid intersecting bar representing its diameter and showing the radius of the circle, with six separate flexible bars that each has a length equal to the radius of the circular ring and one flexible bar that is 0.28 times the radius of the circular ring in length, wherein each of the flexible bars can be attached around the outer circumference of the circle by attachment mechanisms.

10. The device of claim 9, wherein the intersecting bar has marked off units dividing the radius into segments.

11. The device of claim 9, wherein the attachment mechanisms allow the seven flexible bars to be attached around the outer perimeter of the circle, and allow the flexible bars to fit around the perimeter of the circle occupying seven arc lengths equal to the distance between 0 and 57.3 degrees, 57.3 and 114.6 degrees, 114.6 and 171.9 degrees, 171.9 and 229.2 degrees, 229.2 and 286.5 degrees, 286.5 and 343.8 degrees, and 343.8 and 360 degrees of the circle.

12. The device of claim 9, wherein the first six flexible bars are the same size as the radius can be attached by bending or flexing around the outer perimeter by way of the attachment mechanisms.

13. The device of claim 9, wherein the seventh flexible bar is 0.28 radiuses in length and can be attached by bending or flexing around the outer perimeter of the circle by way of the attachment mechanisms.

14. The device of claim 9, when the six flexible radius bars and one 0.28 radius bar are affixed around the circle they represent 6.28 radii.

15. The device of claim 9, further comprising a flexible bar which is 0.14 times the radius of the circular ring in length, wherein when three of the radius bars and one 0.14 radius bar are affixed around half of the circle they represent 3.14 radius.

16. The device of claim 9, wherein each attachment mechanism is a means for attaching the radius bars to the circular ring.

* * * * *